Patented Dec. 25, 1928.

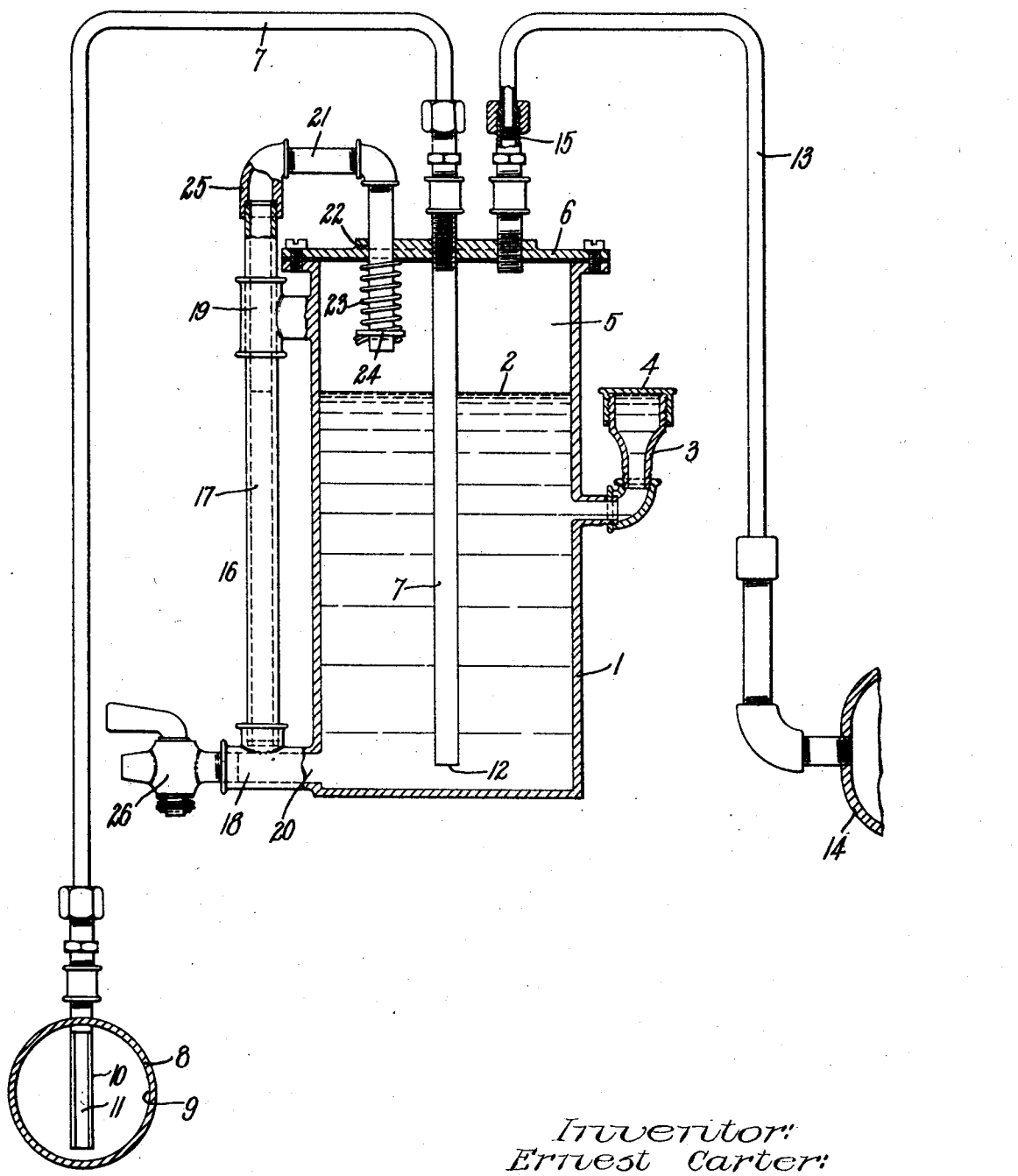

1,696,752

UNITED STATES PATENT OFFICE.

ERNEST CARTER, OF MELROSE HIGHLANDS, MASSACHUSETTS.

HUMIDIFIER FOR INTERNAL-COMBUSTION ENGINES.

Application filed January 3, 1927. Serial No. 158,614.

This invention relates to a humidifier for internal combustion engines and has for its object to provide a device for generating a vapor and conducting the latter to the intake manifold of an internal combustion engine, where said vapor will unite with the gas generated within the carburetor, thereby creating an explosive mixture which will effect a considerable saving in the gasoline or other fuel employed in the engine and will also increase the power of said engine.

It is still further an object of the invention to create the vapor from the liquid employed by passing hot exhaust from the exhaust manifold of the engine through the liquid to be vaporized, said exhaust being discharged into the container for the liquid adjacent to the bottom of said container, and as the exhaust passes upwardly through the liquid the carbon or other solid products of combustion will remain in the liquid, and the clarified carbon monoxide gas, upon passing above the level of the liquid, will unite with the vapor which is formed in a chamber at the top of the container from which it is drawn by suction created in the engine.

The invention consists in a humidifier as set forth in the following specification and partcularly as pointed out in the claims thereof.

The figure of the drawing represents a central vertical section through a humidifier embodying my invention, together with the connections to the exhaust and intake manifolds of an internal combustion engine.

In the drawing, 1 represent a container for a liquid, preferably water, although in freezing weather kerosene, or other similar and practically non-freezing liquids may be employed. The liquid 2 is poured into the container through a filler 3 provided with a cap 4, and the level of said liquid is preferably maintained at the height of the top of the filler, thereby forming a chamber 5 within the container between the top of said liquid and the underside of a cover 6 for said container.

The container 1 is connected by a pipe 7 and suitable pipe fittings to the exhaust manifold 8 of an internal combustion engine and located within an exhaust passage 9 of said manifold is a deflector 10 having an open side 11 adapted to retard the exhaust as the latter passes through said passage 9 and deflect said exhaust into said pipe 7. The portion of the pipe 7 which is located within the container 1 is adapted to discharge the exhaust passing therethrough through a discharge orifice 12 which is located below the level of the liquid 2 and preferably adjacent to the bottom of the container 1. The hot exhaust, after passing from the pipe 7 into the liquid 2, passes upwardly through said liquid heating the latter and causing the vapor to be formed in the chamber 5 at the top of the container, and in passing upwardly through the liquid the carbon and other products of combustion will be collected by the liquid leaving a clarified carbon monoxide gas in the chamber.

The chamber 5 of the container 1 is connected by a pipe 13 with an intake manifold 14 of the internal combustion engine and a small orifice 15 is provided in said pipe 13 adjacent to the top of said container, said orifice limiting the amount of vapor which the engine will cause to be drawn through said pipe.

A level gage 16 is provided for the liquid 2, said gage embodying therein a cylindrical transparent member 17 supported in members 18 and 19 provided upon the container 1 and connected at the lower end thereof through a passage 20 with the interior of said container adjacent to the bottom thereof. The gage 16, at the top thereof, is connected by a pipe 21 and suitable pipe fittings with the chamber 5 of the casing, said pipe being slidably mounted at 22 in the cover 6, and upon the interior of the casing a spring 23 surrounds said pipe, one end of said spring engaging the undersurface of said cover and the lower end of said spring engaging a collar 24 fast to said pipe, and said spring acts to always force said pipe downwardly and hold a fitting 25 in yielding engagement with the upper extremity of the transparent member 17 of said gage.

A drain-off cock 26 is mounted in the member 18 and is utilized in draining the liquid from the container.

The general operation of the device hereinbefore specifically described is a follows:—
Liquid, preferably water, located within the container 1 is vaporized by hot exhaust from the exhaust manifold of an internal combustion engine, said exhaust being discharged below the surface of said liquid, and bubbling up therethrough, and during the passage of said exhaust through said liquid certain of the products of combuston are removed leaving a carbon monoxide gas which collects in the chamber 5 at the top of the container. The exhaust from the exhaust manifold is drawn into the container 1 by suction created within the chamber 5 through the pipe 11 from the intake manifold 14 of the engine, and this suction also causes the vapor formed in the chamber 5, together with the carbon monoxide gas which is mixed with said vapor, to be conducted into the intake manifold where it will unite with the gas passing from the carburetor to the engine, thereby rendering the explosive mixture more efficient and reducing the quantity of fuel necessary to operate the engine.

In cold weather kerosene, or other practically non-freezing liquids, may be employed in the container 5, and the vapor generated by these liquids is utilized as hereinbefore mentioned to increase the efficiency of the explosive mixture.

I claim:—

1. A humidifier of the character described comprising, in combination, a container, liquid partly filling said container, whereby a chamber is formed therein above said liquid, means to connect said chamber with the intake manifold of an internal combustion engine, a pipe extending through said chamber and liquid and communicating with the exhaust passage of said engine and adapted to discharge exhaust into said container below the level of said liquid, and a deflector within said passage to divert a portion of the exhaust from said engine into said pipe.

2. A humidifier of the character described comprising, in combination, a container, liquid partly filling said container, whereby a chamber is formed therein above said liquid, means to connect said chamber with the intake manifold of an internal combustion engine, and a pipe extending through said chamber and liquid and communicating with the exhaust passage of said engine and adapted to discharge exhaust into said container below the level of said liquid.

In testimony whereof I have hereunto set my hand.

ERNEST CARTER.